United States Patent [19]

Harada

[11] Patent Number: 4,562,579
[45] Date of Patent: Dec. 31, 1985

[54] LIGHT BEAM MODULATING AND DEFLECTING SYSTEM

[75] Inventor: Shigeo Harada, Asaka, Japan

[73] Assignee: Fuji Photo Film Co., Ltd., Asaka, Japan

[21] Appl. No.: 435,505

[22] Filed: Oct. 20, 1982

[30] Foreign Application Priority Data

Oct. 23, 1981 [JP] Japan .................. 56-169600

[51] Int. Cl.$^4$ ............................................. H01S 3/10
[52] U.S. Cl. ........................................ 372/26; 372/28; 372/38; 372/43; 372/87
[58] Field of Search ............... 372/26, 87, 28, 43, 372/38; 350/484

Primary Examiner—William L. Sikes
Assistant Examiner—Léon Scott, Jr.
Attorney, Agent, or Firm—Fleit, Jacobson, Cohn & Price

[57] ABSTRACT

A light beam modulating and deflecting system comprising a stationary electrode secured to a stationary body, and a rotatable electrode secured to a rotating body, on which a light source is mounted, and opposed in slightly spaced relation to the stationary electrode to form a capacitor together with the stationary electrode. A high frequency signal modulated with a light modulating signal is applied to the stationary electrode, thereby to feed the light modulating signal from the stationary electrode to the rotatable electrode. The system may comprise a plurality of light sources, stationary electrodes and rotatable electrodes, and high frequency signals modulated with various light modulating signals may be applied to the respective stationary electrodes, thereby to independently modulate the light sources via the rotatable electrodes. Or, the system may comprise a plurality of light sources and a set of the stationary electrode and the rotatable electrode, and a plurality of high frequency signals having frequencies different from one another and modulated with various modulating signals may be combined and applied to the stationary electrode, followed by signal separation and demodulation.

10 Claims, 13 Drawing Figures

F I G. 7A  F I G. 7B
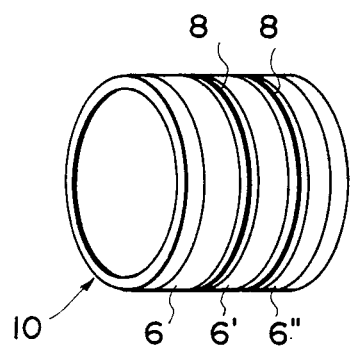
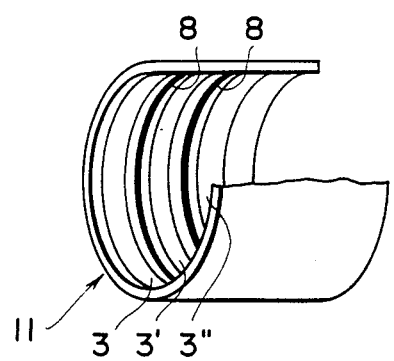
F I G. 8
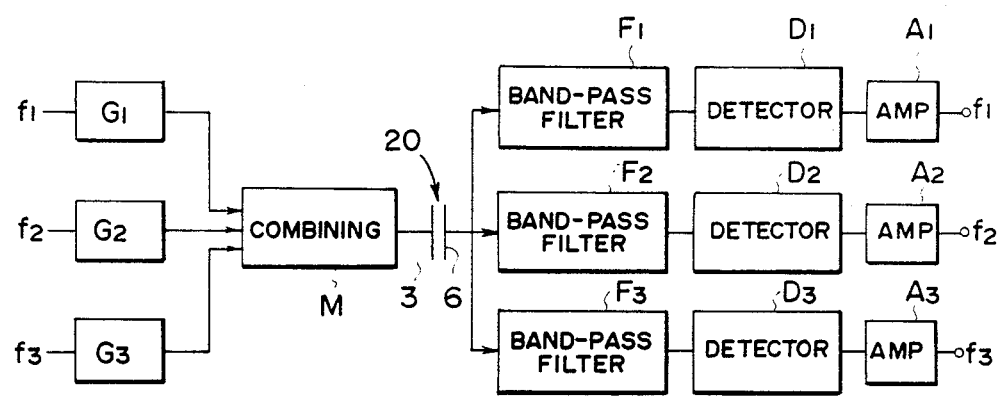

LIGHT BEAM MODULATING AND DEFLECTING SYSTEM

BACKGROUND OF THE INVENTION

1. Field of the Invention

This invention relates to a light beam modulating and deflecting system used to record and read out information by scanning a scanning surface with a light beam such as a laser beam, and more particularly to a light beam modulating and deflecting system which has at least one light source (semiconductor laser, light emitting diode or the like) mounted on a rotating body and which simultaneously carries out both modulation and deflection of the light beam emitted from the light source rotating together with the rotating body, wherein the light beam is deflected through the rotation of the rotating body and, at the same time, modulated by means of the drive current for the light source.

2. Description of the Prior Art

Laser sources can generate light beams exhibiting high spatial interference and a high spectral line brightness that cannot be obtained with the other types of light sources. By virtue of these advantages, laser sources are used for many optical read out and recording systems. For example, the laser sources are used for read out systems such as in facsimile transmitters, automatic readers for label bar codes, and film flaw detectors. The laser sources are also used for recording systems such as in video disc recorders and facsimile receivers. In the past, these laser-based systems employed mainly the gas lasers such as He-Ne, He-Cd and Ar lasers. However, the gas laser sources are intrinsically large in size and, in addition, necessitate additional light scanners and light modulators for deflecting and modulating the light beam during scanning with the light beam. Consequently, such systems using gas lasers are, in general, large in size and expensive. Thus, recently, semiconductor laser systems which are small and exhibit high efficiency have come into increasingly wide use. One example of such a system is that disclosed in Japanese patent application No. 54(1979)-84224 in which a semiconductor laser source is rotated to form linear scanning lines.

The semiconductor laser scanning system described in Japanese patent application No. 54(1979)-84224 is small in size and inexpensive, and yet can modulate and deflect the light beam without necessitating additional devices. In this system, electric power is supplied to the rotating light source by use of brushes. However, semiconductor laser sources are easily damaged by electric shocks and, therefore, break due to the electrical noise caused by the brushes. This conventional system is also disadvantageous in that it cannot be used for long periods of time because of wearing of the brushes.

SUMMARY OF THE INVENTION

The primary object of the present invention is to provide a light beam modulating and deflecting system in which a light beam is deflected through the rotation of a rotating body and modulated by means of a drive current for the light source.

Another object of the present invention is to provide a light beam modulating and deflecting system using no electric contacting means such as brush.

The specific object of the present invention is to provide a light beam modulating and deflecting system which is compact in size and inexpensive, and exhibits long life.

The present invention provides a light beam modulating and deflecting system comprising a stationary electrode secured to a stationary supporting body, and a rotatable electrode secured to a rotating body, on which a light source is mounted, and opposed in slightly spaced relation to said stationary electrode to form a capacitor together with said stationary electrode, a high frequency signal modulated with a predetermined light modulating signal being applied to said stationary electrode, whereby the light modulating signal is fed from said stationary supporting body side to said rotating body side. In the present invention, power necessary for energizing the light source is fed from the stationary electrode to the rotatable electrode without using any electric contact means therebetween. Accordingly, the system in accordance with the present invention has exhibits longer life than a power feeding mechanism using brushes and eliminates the risk of the semiconductor laser source breaking due to electric shocks. Furthermore, the system can be made smaller in size than a power feeding mechanism using a generator. The rotating body of the system is light in weight since the components secured thereto are light, and can be driven with a low-power motor. The system in accordance with the present invention is also advantageous in that electrical adjustments of the parts of the system can be conducted even when the rotating body is being halted. In addition, in the present invention, a plurality of light sources can be mounted on the rotating body and can easily be light-modulated independently from one another.

In the present invention, an air layer may exist between the stationary and rotatable electrodes. However, to obtain a larger capacity, it is advantageous to insert a dielectric exhibiting a large dielectric constant between the electrodes. To minimize the reactance of the capacitor, a high frequency signal modulated with a light modulating signal is employed. It is also possible to feed the light modulating signal as such, supply the electric power necessary for circuits of the rotating body by using another means such as rotary transformer, and position an amplifying circuit in the rotating body.

In one aspect of the present invention, a plurality of light sources are mounted on the rotating body and a plurality of stationary electrodes and rotatable electrodes are positioned, high frequency signals modulated with light modulating signals different from one another being applied to the respective stationary electrodes, whereby the respective light modulating signals are transmitted to the rotatable electrodes and the light intensities of the light sources are modulated independently from one another. In this case, the frequencies of the high frequency signals may be the same or different from one another. When the frequencies thereof are different from one another, it is possible to increase the degree of signal separation by use of a filter circuit. Furthermore, it is possible to classify the light sources into several groups and modulate each group of light sources by one light modulating signal.

To accomplish the above objects, the light beam modulating and deflecting system in accordance with the present invention is formed to supply electric power to the rotating body provided with at least one light source such as semiconductor laser without using any means that contacts the rotating body. Namely, in the system in accordance with the present invention, at least one stationary electrode is secured to the stationary supporting body, and at least one rotatable electrode is secured to the rotating body provided with at least one light source in such a manner that these electrodes can maintain the capacitor function therebetween even during rotation of the rotatable electrode, thereby supplying electric power to the rotating body.

BRIEF DESCRIPTION OF THE DRAWINGS

FIGS. 5 to 7 are schematic views showing various arrangements of the capacitors employed in the system in accordance with the present invention, and FIG. 8 is another electric circuit diagram of the system in accordance with the present invention.

DESCRIPTION OF THE PREFERRED EMBODIMENTS

The present invention will hereinbelow be described in further detail with reference to the accompanying drawings.

Figure 1:
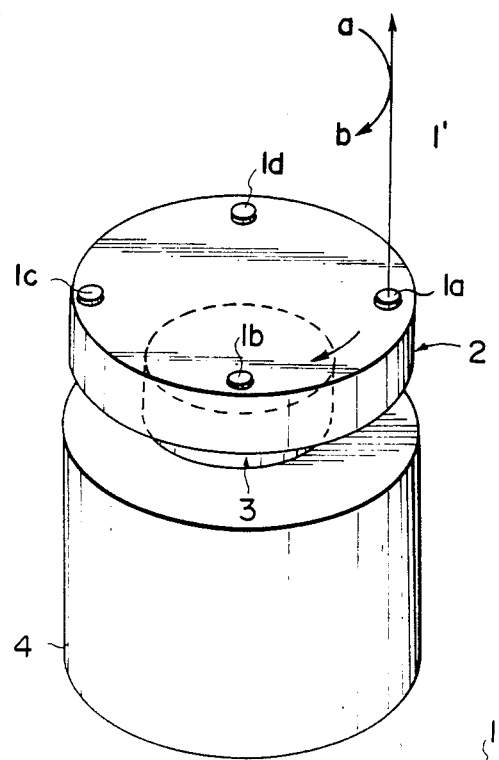
FIG. 1 is a perspective view showing an embodiment of the light beam modulating and deflecting system in accordance with the present invention.
Figure 2:
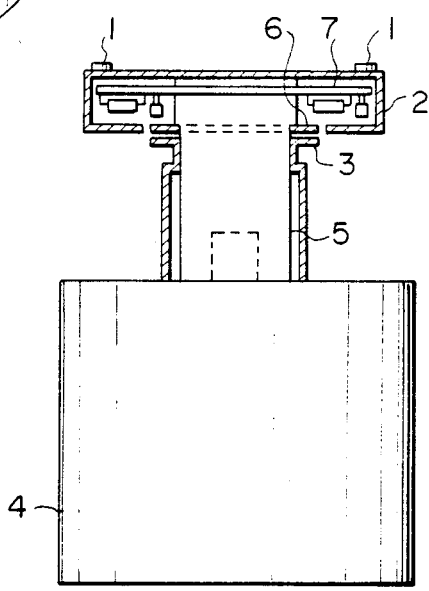
FIG. 2 is a partially sectional view showing the system in accordance with the present invention.

Referring to FIGS. 1 and 2 showing an embodiment of the light beam modulating and deflecting system in accordance with the present invention, semiconductor laser sources 1 are mounted on a rotating body 2. The rotating body 2 is secured to a rotating shaft 5 of a high-speed rotating motor 4, and rotates together with the motor 4. As the rotating body 2 rotates, laser beam 1' emitted from the semiconductor laser sources 1 (1a, 1b, 1c and d) scan a scanning surface in the a→b direction. The rotating body 2 is formed by, for example, a hollow body, and is provided therein with a printed circuit board 7 for driving and controlling the semiconductor laser sources 1. The printed circuit board 7 includes rectifying and smoothing circuits and the like.

Between the rotating body 2 and the rotating shaft 5 are positioned a stationary electrode 3 and a rotatable electrode 6. The stationary electrode 3 is secured to the stationary supporting body. The rotatable electrode 6 is secured to the rotating shaft 5 and the rotating body 2 so as to rotate together with the rotating shaft 5. The stationary electrode 3 is slightly spaced apart from the rotatable electrode 6 so that the former may not rotate together with the latter.

A method of modulating the light beam in the system in accordance with the present invention shown in FIGS. 1 and 2 will be explained below with reference to FIGS. 3 and 4.

Figure 3:
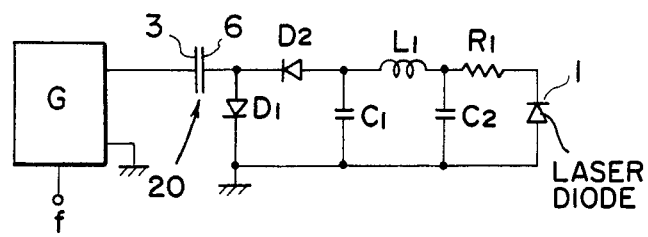
FIG. 3 is an electric circuit diagram of the system in accordance with the present invention.

FIG. 3 is a schematic diagram showing one form of electric circuit employed in the system in accordance with the present invention, and FIGS. 4A to 4D show wave forms in the circuit shown in FIG. 3. In FIGS. 4A to 4D, the horizontal axis shows time, and the vertical axis the relative current value.

Figure 4A:
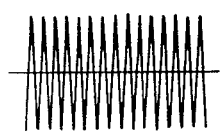
FIGS. 4A to 4D are wave form charts explaining the processing of the light modulating signals conducted in the system in accordance with the present invention.
Figure 4B:
Figure 4C:
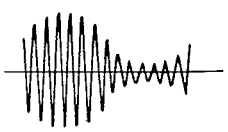
Figure 4D:

In FIG. 3, a high-frequency oscillator G outputs a signal as shown in FIG. 4A. When a desired light modulating signal f as shown in FIG. 4B is applied to the high-frequency oscillator G, the output thereof is modulated to a signal as shown in FIG. 4C. The modulated signal thus obtained is fed to the stationary electrode 3. Accordingly, by the electric power thus applied to the stationary electrode 3, a signal having the wave form as shown in FIG. 4C is induced at the rotatable electrode 6 via a layer of a dielectric (including air) positioned between the electrodes 3 and 6. Electrodes 3 and 6 form capacitive coupler 20. The signal induced at the rotatable electrode 6 is then passed through a rectifying circuit constituted by diodes D1 and D2, and a smoothing circuit formed by capacitors C1 and C2 and a coil L1, to yield a rectified signal as shown in FIG. 4D. The rectified signal is sent to the semiconductor laser source 1. As a result, the semiconductor laser source 1 emits light at an intensity corresponding to the light modulating signal f.

Figure 5A:
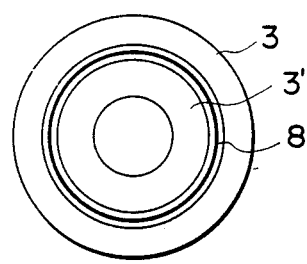
Figure 5B:
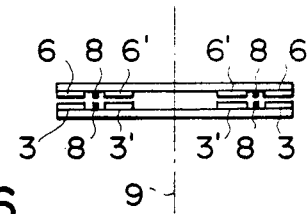
Figure 6:
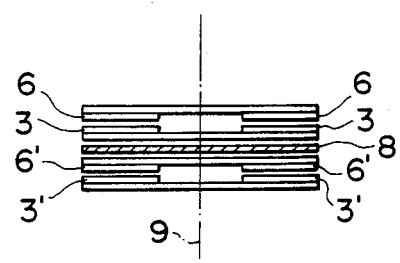

FIGS. 5 to 7 show various arrangements of the capacitors which may be employed to transmit signals in the system in accordance with the present invention. In FIGS. 5A and 5B showing capacitors for transmitting two signals, stationary electrodes 3 and 3' are positioned concentrically, and a guard 8 for preventing signals from leaking is interposed between electrodes 3 and 3'. Similarly, rotatable electrodes 6 and 6' are positioned concentrically on the inner and outer sides of another guard 8, and opposed to the stationary electrodes 3 and 3', respectively, as shown in FIG. 5B so that the rotation center 9 aligns with the center of the concentric stationary electrodes 3 and 3'. In this arrangement, one signal is fed from the stationary electrode 3 to the rotatable electrode 6, and the other from the stationary electrode 3' to the rotatable electrode 6'.

FIG. 6 shows another arrangement of capacitors for transmitting two signals. In FIG. 6, a set of the stationary electrode 3 and the rotatable electrode 6 opposed to each other and a set of the stationary electrode 3' and the rotatable electrode 6' opposed to each other are positioned in the direction of the rotation axis 9.

FIGS. 7A and 7B show three capacitors formed by electrodes positioned on an inner rotatable cylinder 10 and an outer stationary cylinder 11. Stationary electrodes 3, 3' and 3" are positioned on the inner surface of the outer stationary cylinder 11 and isolated from one another by guards 8. Rotatable electrodes 6, 6' and 6" are positioned on the outer surface of the inner rotatable cylinder 10 and isolated from one another by another set of guards 8. Three signals are respectively transmitted from the stationary electrodes 3, 3' and 3" to the rotatable electrodes 6, 6' and 6".

In the present invention, it is also possible to transmit a plurality of light modulating signals by a set of the stationary electrode and the rotatable electrode by employing high frequency signals having frequencies different from one another for the respective light modulating signals.

FIG. 8 shows an embodiment of the electric circuit for transmitting three light modulating signals different from one another by a set of the stationary electrode and the rotatable electrode. In FIG. 8, light modulating signals f1, f2 and f3 are respectively entered into high-frequency oscillators G1, G2 and G3 which generate high frequency signals having frequencies different from one another. The high frequency signals modulated with the light modulating signals f1, f2 and f3 are then combined by a signal combining circuit M, and a combined signal obtained therefrom is sent to the stationary electrode 3. The combined signal is transmitted from the stationary electrode 3 to the rotatable electrode 6 via the dielectric layer or the air layer intervening therebetween of capacitive coupler 20, and then separated into the respective high frequency signals by band-pass filters F1, F2 and F3. The high frequency signals separated from one another are then detected by detecting circuits D1, D2 and D3 to remove high-frequency components from the signals, and demodulated into light modulating signals f1, f2 and f3. The light modulating signals f1, f2 and f3 thus demodulated are then amplified by amplifiers A1, A2 and A3 respectively and used to modulate the light intensities of three light sources such as semiconductor laser sources independently from one another. Electric power necessary for the circuits in the rotating body may be supplied by another means such as rotary transformer.

The system in accordance with the present invention has been described with reference to amplitude modulation. However, it should be understood that any other modulation method, for example, frequency modulation or pulse code modulation, can be employed in the system in accordance with the present invention by changing the demodulating circuit.

I claim:

1. A signal transmission system comprising a stationary electrode secured to a stationary supporting body, and a rotatable electrode secured to a rotating body and a semiconductor type light source mounted on said rotating body and electrically coupled to said rotatable electrode, said rotatable electrode being opposed in a slightly spaced relation to said stationary electrode to form a capacitor, means for modulating a high frequency electrical signal and applying the modulated signal to said stationary electrode, said modulated signal resulting from the modulation of said high frequency signal with a and light information signal, means for driving and controlling said semiconductor light source being located between said rotatable electrode and said semiconductor source, whereby the carrying the light information is transmitted from said stationary electrode on said supporting body side to said rotatable electrode on said rotating body side.

2. A system as defined in claim 1 wherein said light source is a semiconductor laser source.

3. A system as defined in claim 1 wherein said means for driving and controlling said semiconductor light source is a printed circuit board for driving and controlling said semiconductor light source mounted in said rotating body, and said rotatable electrode is connected to said printed circuit board.

4. A system as defined in claim 3 wherein said printed circuit board contains a rectifying circuit and a smoothing circuit.

5. A system as defined in claim 1 wherein said rotating body is in disc form and is secured to a rotating shaft of a high-speed rotating motor.

6. A system as defined in claim 1 wherein said system comprises a plurality of said semiconductor light sources, a plurality of said stationary electrodes and a plurality of said rotatable electrodes in a number equal to one another, a plurality of high frequency signals modulated with light information signals different from one another, said modulated signal being applied to said stationary electrodes, whereby said modulated signals carrying said light information are respectively supplied to said rotatable electrodes opposed to said stationary electrodes and the output of said semiconductor light sources are light-modulated independently from one another.

7. A system as defined in claim 6 wherein a plurality of sets of said stationary electrodes and said rotatable electrodes are concentrically positioned with respect to one another.

8. A system as defined in claim 6 wherein a plurality of sets of said stationary electrodes and said rotatable electrodes are stacked in an axially spaced relation with each other with respect to the axis of rotation axis of said rotatable electrodes.

9. A system as defined in claim 6 wherein said stationary supporting body is an outer stationary cylinder and said stationary electrodes are positioned on an inner surface of said outer stationary cylinder, and said rotating body includes an inner rotatable cylinder with respect said outer stationary cylinder, and said rotatable electrodes are positioned on the outer surface of said inner rotatable cylinder in slightly spaced relation to said stationary electrodes.

10. A system as defined in claim 1 wherein said system comprises a plurality of said semiconductor light sources and said stationary electrode and said rotatable electrode, a plurality of high frequency signals having frequencies different from one another and being modulated with a plurality of light information signals different from one another, means for combining the modulated signals and applying them to said stationary electrode, means for separating the combined signal transmitted to said rotatable electrode from said stationary electrode and demodulating the combined signal into light information signals and applying said information signals via the driving means to light-modulate said semiconductor light sources independently from one another.

* * * * *